United States Patent
Mol et al.

(10) Patent No.: US 8,833,173 B2
(45) Date of Patent: Sep. 16, 2014

(54) STRAIN SENSOR

(75) Inventors: Hendrik Anne Mol, Sleeuwijk (NL);
John Van De Sanden, Nieuwegein (NL);
Laurens Verhulst, Utrecht (NL)

(73) Assignee: Aktiebolaget SKF, Gothenburg (SE)

( * ) Notice: Subject to any disclaimer, the term of this patent is extended or adjusted under 35 U.S.C. 154(b) by 152 days.

(21) Appl. No.: 13/383,551

(22) PCT Filed: Jul. 17, 2009

(86) PCT No.: PCT/EP2009/005544
§ 371 (c)(1),
(2), (4) Date: Jan. 11, 2012

(87) PCT Pub. No.: WO2011/006523
PCT Pub. Date: Jan. 20, 2011

(65) Prior Publication Data
US 2012/0118070 A1   May 17, 2012

(51) Int. Cl.
*G01B 5/30* (2006.01)
*G01B 7/16* (2006.01)
*G01L 1/00* (2006.01)
*G01N 3/00* (2006.01)
*G01L 5/00* (2006.01)
*G01G 3/14* (2006.01)

(52) U.S. Cl.
CPC .............. *G01G 3/14* (2013.01); *G01L 5/0019* (2013.01); *G01B 7/20* (2013.01); *G01G 3/1412* (2013.01)
USPC ................................. 73/760; 73/781; 73/787

(58) Field of Classification Search
USPC ...................................................... 73/760, 781
See application file for complete search history.

(56) References Cited

U.S. PATENT DOCUMENTS

| | | | |
|---|---|---|---|
| 3,599,479 A * | 8/1971 | Kutsay ............................ 73/781 |
| 3,724,274 A * | 4/1973 | Millar ............................. 73/726 |
| 4,102,031 A * | 7/1978 | Reichow et al. ................ 29/464 |
| 4,166,997 A * | 9/1979 | Kistler .............................. 338/5 |
| 2004/0089073 A1* | 5/2004 | Benzel et al. ................... 73/725 |
| 2011/0255813 A1* | 10/2011 | Mol et al. ...................... 384/448 |

FOREIGN PATENT DOCUMENTS

| | | | |
|---|---|---|---|
| JP | 2007239848 A | 9/2007 | |
| WO | WO2009076988 A1 | 6/2009 | |
| WO | WO 2009076988 A1 * | 6/2009 | ............. F16C 19/52 |

* cited by examiner

*Primary Examiner* — Lisa Caputo
*Assistant Examiner* — Jamel Williams
(74) *Attorney, Agent, or Firm* — Bryan Peckjian; SKF USA Inc.

(57) ABSTRACT

The present invention defines a strain sensor for measuring strains induced on a component surface (34). The strain sensor comprises a strain gauge (31) and a support member (32), whereby the support member is attached to the component surface only at first and second attachment places. The support member comprises a beam portion (39) that is adapted to bend in response to a relative displacement of the first and second attachment places, and the strain gauge is integrated on a surface (33) of this beam portion. To ensure a strong and stable bending response of the beam portion, the attached support member comprises at least one flexure hinge (45).

19 Claims, 5 Drawing Sheets

STRAIN SENSOR

TECHNICAL FIELD

The present invention concerns a strain sensor for measuring strains induced on a component surface, particularly a surface of a rolling element bearing. The present invention also concerns a method of attaching a strain sensor to a component surface, particularly a bearing surface, by means of a heat joining process.

BACKGROUND WITH STATE OF ART

Bearings are devices that permit constrained relative motion between two parts. They may be used in many different types of machinery to retain and support rotating components such as, for example, a wheel on a vehicle, a vane on a windmill or a drum in a washing machine. A typical bearing comprises inner and outer rings and a plurality of rolling elements, and may further comprise a cage to retain the rolling elements. During use, the bearing is subjected to different loads, both static and dynamic. The static load is mainly due to the weight supported by the bearing and may also be due to a preload with which the bearing is mounted. The dynamic loads are time-dependent and are due to the operating conditions.

In many systems, it is desirable to be able to monitor the load acting on a bearing. In modern vehicles, for example, load data from the wheel bearings are used in the control of vehicle stability systems. Displacement sensors such as strain sensors are commonly applied to bearings to measure load and deformation. In some cases, plastic foil sensors are adhesively bonded to e.g. an outer circumference of a bearing outer ring. Adhesive bonding has many disadvantages, however. The bearing surface must be cleaned and prepared for bonding, the attachment is a manual process, the adhesive can take several hours to cure and, moreover, the adhesive can be subject to creep over time, which impairs the reliability of the sensor signal.

Metal foil strain sensors can also be used. Such strain sensors are attached to a bearing surface by means of e.g. spot welding, whereby the metal foil is attached around its entire periphery using a specific pattern of spot welds. The attachment of foil strain sensors to a bearing surface is again an essentially a manual process, making these sensors unsuited for automated mounting and integration in a production-line environment. Furthermore, foil strain sensors have a low strain sensitivity, which places stringent requirements on a signal conditioner when used at the low operating voltages common in contemporary electronic systems.

In JP 2007239848, a bearing provided with a sensor unit is suggested, whereby the sensor unit comprises at least one sensor mounting member and at least one strain sensor mounted on the sensor mounting member. The sensor mounting member is attached to a radially outer surface of the bearing outer ring at two fixing portions separated from each other in the circumferential direction, and the strain sensor is disposed on the sensor mounting member between the two fixing portions. The sensor mounting member may be attached to the bearing outer ring by means of a bolted connection, adhesive bonding or welding.

There is room for improvement, however, in terms of realizing a strain sensor that can be attached to a bearing surface, or other component surface, in a straightforward automated process and which, after attachment, enables a strong and stable strain signal to be sensed.

SUMMARY

The present invention defines a strain sensor for measuring strains induced on a component surface, the strain sensor comprising a support member and a strain gauge integrated on the support member. The support member is arranged to be attached to the component surface only at first and second attachment places using only first and second attachment means. Further, the support member comprises a beam portion that is adapted to bend in response to a relative displacement between the first and second attachment places, whereby the strain gauge is integrated on the beam portion. To ensure a strong and stable bending response of the beam portion, the attached support member comprises at least one flexure hinge.

A strain sensor according to the invention is particularly suited for use in combination with a rolling element bearing. The bearing can be provided with one or more inventive strain sensors for measuring loads exerted on the bearing. When, for example, the support member is attached to a radially outer surface of the bearing outer ring, with a circumferential spacing between the first and second attachment places, a load on the bearing can induce a tensile strain on the radially outer surface. The tensile strain causes a relative displacement between the first and second attachment places of the support member. As a result, a bending moment is exerted on the beam portion of the support member. Under bending, one surface of the beam will be in tension, an oppositely oriented surface in compression. The strain gauge is integrated on a surface of the beam portion that is subjected to these tensile or compressive forces, thereby measuring a strain signal that is proportional to the load acting on the bearing.

To obtain a strong strain signal, it is advantageous if the strain measured by the strain gauge (apparent strain) is as close as possible to the strain on the component surface to which the support member is attached (actual strain). Furthermore, it is important that the support member is caused to bend in a reliable and predictable manner, so that the apparent strain measured for a particular actual strain remains essentially constant over the lifetime of the component. In other words, it is important that the strain sensor produces a stable strain reading. This is achieved according to the invention in that the attached support member will rotate around the at least one flexure hinge, causing a reliable and predictable bending response in the support element.

A flexure hinge is to be understood as an elastically flexible, slender region between two rigid parts that must undergo limited relative rotation. In one example, the component surface is one of the rigid parts, the other rigid part being formed by the support member. Preferably, the attached support member comprises a first and a second flexure hinge at sides of the support member corresponding to the first and second attachment places, to further enhance the bending response of the support member.

In a first aspect of the invention, the at least one flexure hinge is formed by one of the first and second attachment means that attach the support member to the component surface. In a preferred embodiment, the support member is welded to the component surface by means of a first welded connection and a second welded connection, whereby the first and second flexure hinges are respectively formed by the first and second welded connections. In one example, the support member consists of a bending beam and has a length greater than its width and corresponding longitudinal and lateral edges. Suitably, the beam is welded to the component surface along its lateral edges, and is designed such that a minimum predetermined distance exists between a neutral plane of zero bending through the beam and a surface of the beam on which the strain gauge is integrated. In other words, to ensure that a measurable strain reading is obtainable, the beam has a thickness of at least 0.5 mm. Preferably, the beam thickness is at least 0.8-1.0 mm. In a further example, the support member has a U-shaped or an H-shaped cross-section, as described in greater detail below with regard to a second aspect of the invention.

When the component surface is a bearing surface made of bearing steel, at least the parts of the support member that are welded to the bearing surface are made from a material that is compatible for welding to bearing steel. Examples of suitable materials are low carbon steels, titanium and nickel. Advantageously, the support member may be welded to the bearing surface using a filler material that comprises Nickel. The nickel-based filler not only improves the quality of the weld, but also increases the ductility of the welded connections, enhancing their capacity to serve as flexure hinges.

In one embodiment of the first aspect, a strip of filler material is provided on an underside of the support member, at the lateral edges, prior to welding. The strips of filler material thus act as attachment feet, raising the main body of the support member relative to the component surface. The attachment feet provide a relatively slender region between the main body of the support member and the component surface, which enhances the creation of a flexure hinge in the first and/or second welded connections. Alternatively, the strips of filler material can be provided on the component surface prior to welding. In a further example, the support member is shaped to have relatively slender first and second attachment feet, and a strip of filler material may be provided at each lateral edge of the attachment feet.

When the first and/or second flexure hinge is formed by a welded connection, it has been found that the support member is advantageously attached to the bearing surface using a welding angle of between 20 and 25 degrees relative to a tangent to the component surface at the attachment place. In a particularly preferred embodiment, the applied welding angle is 22.5 degrees. The first and second welded connections can be a first and a second weld seam or can be a first and a second row of spot welds. The term "welded connection" is also to be understood as incorporating connections that are produced by means of a heat-joining process such as laser welding, laser brazing or resistance welding/brazing.

In the second aspect of the invention, the support member itself comprises the at least one flexure hinge. Suitably, the support member has a U-shaped or an H-shaped profile and comprises two upright portions at either side of the bending beam portion. In one embodiment, the bending beam and the upright portions are integrally formed as one piece. In an alternative embodiment, the upright portions are manufactured separately and are joined to the bending beam by a stiff connection. The stiff connection may be realized by mechanical fixation, welding or any other suitable method. At least one of the upright portions incorporates a flexure hinge. Preferably, each of upright portions incorporates a flexure hinge. The flexure hinge is an elastically flexible, slender region between rigid first and second parts of each upright. A rigid first part of each upright portion is attached to the component surface. A rigid second part of each upright adjoins the bending beam portion. The flexure hinge is provided between the first and second rigid parts of at least one upright.

The rigid first and second parts can lie at opposite ends of each upright, creating a U-shaped support member, or the rigid second part can lie between opposite ends of each upright, creating an H-shaped support member. Again the support member may have a length greater that its width, whereby the first and second attachment places are formed at first and second lateral edges of the support member. In the second aspect of the invention, there is preferably a stiff connection between the component surface and the support member. Thus, when the component surface experiences tension or compression, the flexure hinge acts as a hinge point around which the rigid second part of an upright will rotate. Since the uprights are stiffly connected to the bending beam portion, the beam portion is caused to bend.

In one embodiment of the second aspect of the invention, first ends of each upright, i.e. the attachment ends, are attached to the bearing surface by means of a form fit. The attachment end of each upright then has a predefined shape that fits into a corresponding recess in the component surface, whereby friction between the recess surface and the attachment end surface firmly secures the support member to the component surface. In a further embodiment, attachment to the component surface takes place by means of an interference fit between the attachment end of each upright portion and a corresponding recess in the component surface. Alternatively, the component surface may be provided with a first and a second groove that are adapted to receive the attachment end of the first and second upright portions. At least the first groove may have a protruding edge which, after the attachment ends have been placed in the grooves, is deformed against the attachment end of the first upright portion, to lock it place. The second attachment end may also be fixed in a corresponding manner by deforming a protruding edge of the second groove. Suitably, the deformation may be performed in a forging process.

In a still further embodiment of the second aspect, the uprights are welded to the component surface. Unlike the first aspect of the invention, the welded connections do not function as a flexure hinge and are stiff connections. In an advantageous further development of this embodiment, each upright portion comprises a foot extending from the first end. The corresponding first foot and second foot extend in opposite directions, such that a part of each foot protrudes beyond the lateral edge of the corresponding upright portion. The advantage of this development is that the support member can be welded to the component surface using a weld angle of 90 degrees. In other words the welding electrode or the laser beam can be positioned directly above the protruding parts of the feet. This enhances the automatability of the welding/brazing process. In a preferred example, the first and second welded connections are executed simultaneously by using e.g. two side-by-side resistance welding electrodes or two side-by-side laser beams. Thus, the support member of a strain sensor according to the second aspect of the invention can be attached to the component surface in a fast and automated process.

To enhance the quality of the weld, an underside of each foot advantageously comprises Nickel. In an alternative example, the component surface is provided with side-by-side strips of Nickel and the feet of the support member are then welded to the strips.

In a still further embodiment of the second aspect of the invention, the component surface is a surface of an intermediate carrier element, whereby the intermediate carrier is adapted for attachment to a machine part such as a rolling element bearing. When the machine part is a radially outer surface of a bearing outer ring, the intermediate carrier can be a sheet metal ring or part ring with a radius of curvature equal to that of the bearing outer ring. Alternatively, the radius of curvature of a part ring can be somewhat smaller than that of the surface to which it is attached, such that a clamping effect is achieved. The intermediate carrier is attached to the bearing surface with a rigid connection. This can be achieved by means of a heat-joining process, such as welding, or by mechanical fixation.

Adhesive bonding is also possible. Advantageously, the intermediate carrier can comprise more than one strain sensor according to the second aspect of the invention. The support member of the one or more strain sensors is attached to the intermediate carrier by a stiff connection. This can be done by means of welding, a form fit, or an interference fit as previously described.

The support member of the one or more strain sensors can be attached to the intermediate carrier after the carrier has been attached to the bearing surface. In a preferred example, the intermediate carrier comprises several strain sensors which are attached to carrier prior to its attachment to a machine part. The advantage of this example is that strain sensors can be provided in the form of a sensor module, whereby only a single attachment process is required with respect to the machine part.

The present invention also provides a method of attaching a strain sensor to a surface of a component. In one embodiment, the component is a bearing comprising an inner ring and an outer ring. The strain sensor comprises a strain gauge integrated on a rigid support member, and is attached to the bearing surface only at first and second attachment places. According to the inventive method, the strain sensor is welded to the bearing surface by means of a first welded connection and a second welded connection, corresponding to the first and second attachment places, and at least the first welded connection is produced using a welding angle of between 20 and 25 degrees relative to a tangent to the bearing surface at the first attachment place. In a preferred embodiment, the method further comprises producing the second welded connection using a welding angle of between 20 and 25 degrees relative to a tangent to the bearing surface at the second attachment place. In a further development, the method comprises a step of providing an attachment foot between a main body of the support member and the bearing surface, at the location of the first and/or second welded connections. In one embodiment, the attachment foot is formed by a strip of filler material, such as a Titanium-Nickel filler. The attachment foot has a length that is essentially equal to a length of the first and/or second welded connections. Further, the attachment foot has a height and thickness that are significantly smaller in relation to the length. After welding, the first and second welded connections function as flexure hinges, enabling the strain gauge to measure a strong and stable strain signal.

Thus, a strain sensor according to the invention ensures that the strains induced on a component surface are reliably and predictably transferred to the strain gauge, meaning that the loads can be accurately determined over a long period of time. The inventive strain sensor can also be attached to a component surface in a fast and straightforward manner that is suitable for integration in an automated production line. Other advantages of the present invention will become apparent from the detailed description and accompanying figures.

BRIEF DESCRIPTION OF THE DRAWINGS

The invention will now be described in more detail for explanatory and in no sense limiting purposes with reference to the following figures, in which.

DETAILED DESCRIPTION

When there is a need to measure the loads acting on a rotationally supported component, one way of accomplishing this is to measure deformation of a bearing ring in a bearing that is used to support the component. The loads cause the bearing ring to deform, which deformation can be measured by attaching one or more strain sensors to a surface of the bearing ring, e.g. an outer circumference of the bearing outer ring. Strain sensors, such as plastic-foil strain gauges, can be adhesively bonded to the bearing surface, but adhesive bonding is a time-consuming process that is usually carried out manually. A further drawback is that over time, the adhesive can be subject to creep, which impairs the reliability of the strain signal over time. Metal-foil strain gauges can also be applied, whereby the perimeter of the metal foil gauge is welded to the bearing surface using a specific pattern of spot welds. Thus, the spot welding process is relatively time-consuming and complex. Foil strain gauges (metal foil and plastic foil), moreover, have a low sensitivity to strains, which places stringent requirements on a signal conditioner when operating at the low supply voltages common in contemporary electronic systems. In addition, foil strain gauges have a low resistance, causing considerable dissipation.

Thus, there is a need for a strain sensor which has a high sensitivity to strains and a high resistance, which can be attached to a bearing surface in a fast, automated process, and which produces a strong and stable strain signal over the life of the bearing.

Figure 1:
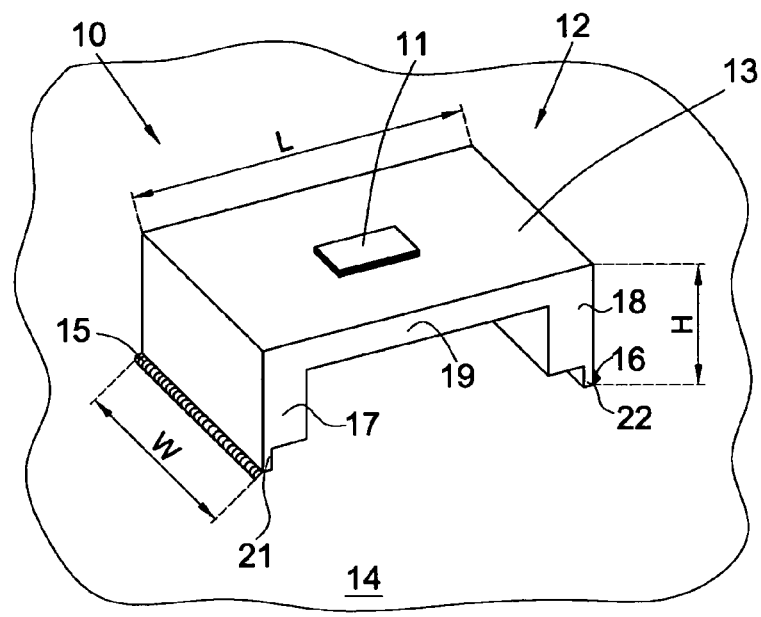
FIG. 1 is a schematic perspective view of a strain sensor according to a first aspect of the invention, attached to a component surface.
Figure 2:
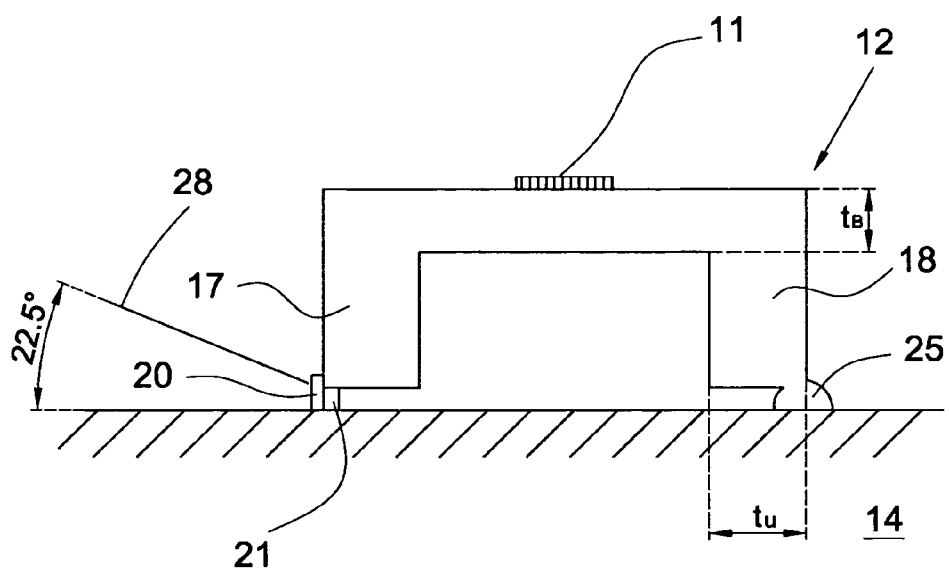
FIG. 2 is front view of FIG. 1, in which the strain sensor is shown in a partially attached condition.

An example of a strain sensor that fulfils the above-mentioned requirements is shown in FIG. 1, which represents a perspective view of the strain sensor attached to a component surface. A front view of the same sensor is shown in FIG. 2 in a partially attached condition. In this example, the component surface is a radially outer surface of a bearing outer ring. The strain sensor 10 comprises a resistive strain gauge 11 that is printed and sintered (thick film), or deposited (thin film), directly onto a surface of a support member 12. The strain gauge measures strains induced on this surface of the support member, which will be referred to as a measuring surface 13. Suitably, the strain gauge 11 comprises first and second elements orientated in mutually orthogonal directions, whereby the first element is an active element to sense strains and the second element is a passive element to compensate for temperature effects. Half-bridge and other configurations are also possible. The strain gauge 11 may be formed from, for example, a resistor material or a semiconductor material. Examples of resistor materials are metals, metal oxides and ceramics. Specific examples include ruthenium oxide, tantalum nitride, lead oxide, bismuth ruthenate, bismuth iridate and nickel-chromium. A suitable example of a semiconductor material is silicon or an oxide thereof.

In the example of FIG. 1, the support member 12 is welded to the bearing surface 14 by means of a first welded connection 15 and a second welded connection 16. Suitably, the support member 12 comprises a low carbon steel, or electrodeposited and etched nickel, including alloys thereof, or titanium, including alloys thereof. These materials have been found to be compatible with bearing steels, such as SAE1055, SAE1070, SAE 52100 (100Cr6), DIN 100CrMn6, DIN 102CrMo17 and DIN 100CrMo7-3, for the purposes of welding or brazing. Examples of preferred low carbon steels for the support 12 include stainless and heat resistance steels such as AISI 304, AISI 304L, AISI 316, AISI 316L and 17-4PH and AISI 430. Low carbon steels for the support member 12 have the further advantage of having a coefficient of thermal expansion that is essentially equal to that of bearing steels. Preferably, the measuring surface 13 of the support member 12 comprises a high-chromium steel (stainless steel), which forms an excellent substrate for the thick-film printing or the thin-film deposition of the strain gauge 11.

The support member 12 may have an essentially U-shaped profile, as shown in FIG. 1 and FIG. 2, and comprise a first upright portion 17 and a second upright portion 18 joined by a bending beam portion 19. The bending beam portion 19 comprises the measuring surface 13 and each upright portion 17, 18 has a first end and a second end, whereby the first ends are adapted for attachment to the bearing surface 14. Thus, the first upright portion 17 of the support member is attached to the bearing surface 14 by means of the first welded connection 15; the second upright portion 18 by means of the second welded connection 16. An advantage of a support member with upright portions is that the first ends can be suitably shaped to allow the strain sensor to be attached to a curved surface without bending the strain gauge 11 and inducing a high pre-stress. In the example of FIG. 1, the first upright and the second upright are depicted with a corresponding first attachment foot 21 and a second attachment foot 22. These attachment feet are slender portions relative to the adjacent portion of the uprights 17, 18, which slightly raise the main body of the support member 12 from the bearing surface 14. In practice, the first and second attachment feet 21, 22 will be fused during the welding process and become part of the first and second welded connections 15, 16 respectively.

The support member 12 has a length L, corresponding to the length of the bending beam 19, and a width W and a height H corresponding to the width and height of each upright 17, 18. Preferably, the support member has a length that is greater than its width, whereby the support member 12 is attached at each lateral end along its width, and the strain gauge 11 is oriented in the longitudinal direction to be sensitive to compressive or elongation strains. The beam portion 19 is designed to have a low resistance to bending, and has a thickness $t_B$ (see FIG. 2) that is many times smaller than its length and width. The first and second welded connections 15, 16 can be weld seams executed over the full width W of the upright portions, as shown in FIG. 1. Alternatively, the welded connections can be formed by a first and second row of spot welds. Throughout the description, a welded connection should further be understood as an attachment produced in a heat joining process selected from one of a welding process, a brazing process or a soldering process. Laser welding, resistance welding laser brazing are examples of preferred heat joining processes, as they can be automated and are highly suitable for integration in a production line environment.

The support member 12 of the strain sensor 10 is attached to the bearing surface 14 at only two connection places. Thus, when a load acting on the bearing causes the bearing surface 14 to e.g. stretch, a force is exerted on the first and second welded connections that acts to pull the connections 15, 16 away from each other. As will be explained, this induces a bending moment on the bending beam portion of the support member 12, whereby the measuring surface will experience compressive strain and an underside of the bending beam portion 19 will experience elongation strain. The magnitude of the strains induced on the measuring surface 13 is partly dependent on the distance between the measuring surface 13 and a neutral plane of zero bending that passes through the centroid of beam cross-section. Thus, to ensure that a measurable strain reading is produced on the measuring surface 13, the bending beam 19 is suitably designed such that a predetermined minimum distance exists between the centroid of beam cross section and the measuring surface. It has been found that 0.25 mm is a sufficient minimum distance. Thus, when the bending beam 19 has a rectangular cross-section, the thickness $t_B$ of this beam is preferably at least 0.5 mm. More preferably, the thickness of the beam portion is at least 0.8 mm.

The support member can be designed to further optimise the amount of strain that is measurable on the measuring surface 13. Suitably, each upright portion 17, 18 is designed to be stiffer than the beam portion 19, so that a displacement of the first and second welded connections 15, 16 exerts a sufficient bending force on the beam portion. Thus, each upright portion preferably has a height H that is not more than 5 times greater the thickness $t_B$ of the beam portion. Likewise, each upright 17, 18 preferably has a thickness $t_U$ greater than the thickness of the beam 19. In one example of a support member used in a strain sensor according to the invention, the bending beam 19 has a length L of 1 cm, a width W of 0.5 cm and a thickness $t_B$ of 0.15 cm, while each upright 17, 18 has a height H of 0.5 cm, a width W of 0.5 cm and a thickness $t_U$ of 0.3 mm.

It is also important that a strain induced on the bearing surface 14 (actual strain) is reliably and predictably transferred to the measuring surface 13 of the support member 12, to ensure that the measured strain on the measuring surface (apparent strain) accurately represents the actual strain on the bearing surface 14 for a long service duration. According to the invention, this is achieved in that the attached support member comprises a first flexure hinge. Preferably, the attached support member further comprises a second flexure hinge.

In a first aspect of the invention, as shown in FIG. 1, the first flexure hinge is formed by the first welded connection 15 and the second flexure hinge is formed by the second welded connection 16. Thus, when a load acting on the bearing causes the bearing surface 14 to stretch or compress, and the first and second welded connections to be correspondingly displaced, the first and second upright portions 17, 18 act as relatively stiff elements. This is because the first and second welded connections 15, 16 act as hinge points around which the upright portions must rotate. The bending beam portion 19 of the support member 12 is stiffly connected to the upright portions 17, 18, and the bending beam portion 19 is therefore caused to bend. As a result, the flexure hinges further enhance the measurable strain on the measuring surface 13 and also ensure that the strain reading remains stable. If, for example, a slight change occurs over time in the stiffness of the attachment between an upright portion and the bearing surface, the strain reading on the measuring surface will be only marginally affected because of the high degree of mechanical compliance. Thus, a rolling element bearing provided with one or more strain sensors according to the invention and suitable processing means for determining the loads acting on the bearing will continue to provide an accurate determination for a long duration.

A flexure hinge is to be understood as an elastically flexible, slender portion between two adjacent rigid portions. In the example of FIG. 1, the adjacent rigid portions are formed by the component surface 14 and each upright 17, 18, whereby the flexure hinge has a thickness smaller than the thickness $t_U$ of each upright. When the flexure hinge is executed as a weld, it has been found that welding angle is important. Welding angle refers to an angle between an electrode rod or a laser beam and the component surface at the place of attachment. Thus, when the component surface is a curved bearing ring, the welding angle is measured relative to a tangent to the bearing surface at the attachment place. Preferably, a welding angle of between 20 and 25 degrees is used.

The method of attachment according to the invention will be explained with reference to FIG. 2, whereby the first upright portion is shown prior to being welded to the bearing surface; the second upright portion is shown after welding.

In FIG. 2, the first upright portion 17 has been provided with a strip of filler material 20 at the location of the first attachment foot 21. Alternatively, the filler material can serve as an attachment foot on its own. The filler material 20 may then be provided at a peripheral edge of each upright portion and protrude beyond an underside of the upright, so that support member 12 is slightly raised relative to the bearing surface 14. Furthermore, the strip of filler material 20 can be provided on the underside of each upright portion, or on both the underside and the peripheral edge of each upright portion. In a preferred embodiment, when the component surface is a bearing surface, the filler material is a Nickel-Titanium filler, which has been found to enhance weld quality. Using a laser beam 28 directed at an angle of 22.5 degrees relative to the bearing surface 14 at the attachment place, the first upright portion 17 is welded to the surface. Suitably, during the welding process, a holding means presses the support member 12 against the bearing surface 14. After welding, an elastically flexible, slender portion, i.e. a flexure hinge 25, is created between the upright and the bearing surface, as depicted for the welded connection of the second upright portion 18. In addition to facilitating the realization of a flexure hinge, the use of a welding angle of between 20 and 25 degrees has a further advantage. It has been found that the use of a welding angle in this range minimises the amount of pre-stress that is induced on the strain gauge during the welding process.

When the support member is welded to the bearing surface, a heat affected zone is created around the first and second welded connections. In other words, the metallurgical structure of the bearing and of the support member changes locally, inducing a local stress. Potentially, the strain on the sensor gauge could be subject to an essentially uncontrolled offset after the attachment process. Furthermore, a one-time offset correction procedure (i.e. calibration) at the end of the attachment process may not be sufficient to guarantee a stable strain signal over time, since the residual stress at the attachment places will change during work loading of the bearing. This is a work-induced relaxation of the stress in the heat affected zones of the bearing and of the support member. Therefore, after welding, the first and second welded connections are advantageously subjected to a stress relaxation process. This may comprise local reheating of the welds after the welding process and/or ultrasonic excitation of the welds. Ultrasonic excitation induces vibrations which "shake out" and settle the residual stress in the zone around the first and second welded connections, to a level such that the normal operating loads on the bearing no longer produce a work-induced relaxation.

Figure 3:
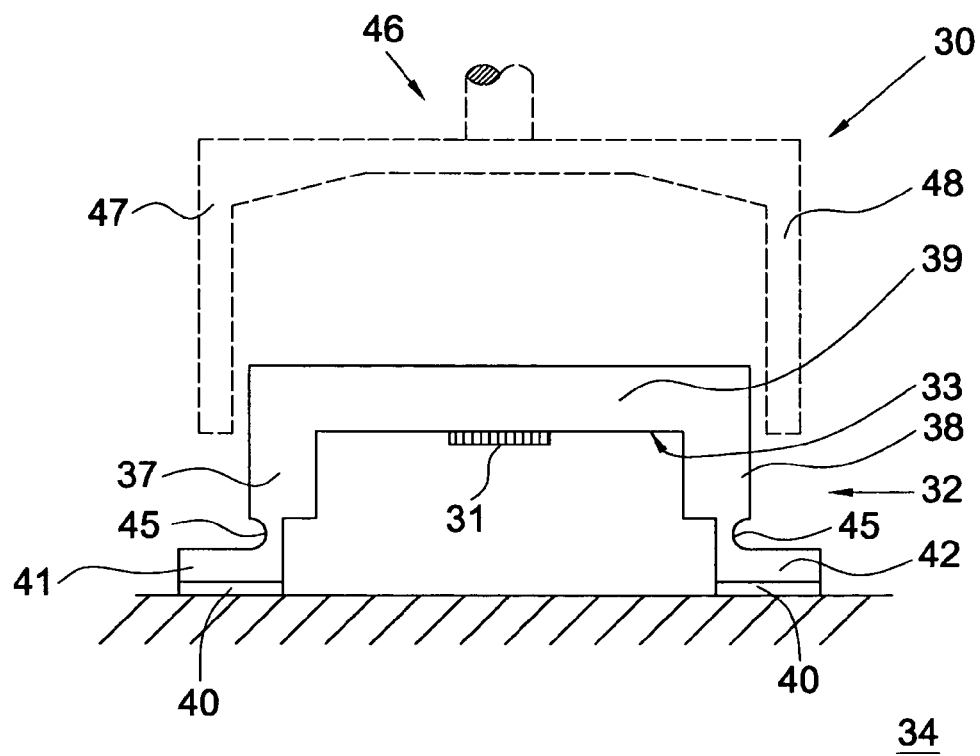
FIG. 3 is a front view of a strain sensor according to a second aspect of the invention, attached to a component surface.

In a second aspect of the invention, as shown in FIG. 3, the at least one flexure hinge is formed in the support member itself. FIG. 3 shows a front view of an example of an attached strain sensor according to the second aspect. The strain sensor 30 has a support member 32 with an essentially U-shaped profile, comprising a bending beam portion 39 with integrally formed first and second upright portions 37, 38 at either side of the beam. The support member 32 further comprises first and second attachment feet 41, 42, which are welded to a component surface 34 only at first and second attachment places. In this example, the first upright portion 37 and the first attachment foot 41, and the second upright portion 38 and the second attachment foot 42 are joined by a flexure hinge 45, being an elastically flexible, slender portion in relation to adjacent first and second rigid parts. Thus, in the second aspect of the invention, the first rigid part is formed by an upright portion 37, 38 and the second rigid part is formed by the corresponding attachment foot 41, 42.

If the component surface is a bearing surface that stretches due to a load on the bearing, the relative displacement between the first and second attachment feet will cause the first and second uprights 37, 38 to rotate about the flexure hinges 45 and cause the bending beam portion 39 to bend. In this example, the strain gauge 31 is provided on an underside of the bending beam 39 and measures strain induced on that surface, i.e. the measuring surface 33. Tensile strains are induced on the measuring surface 33 when the attachment feet are stretched apart. As described previously, the actual strain on the component surface is reliably and predictably transferred to the measuring surface in that at least one flexure hinge is provided between the component surface and the measuring surface of the attached strain sensor. Preferably, the strain sensor comprises first and second flexure hinges as shown in FIG. 3.

When the at least one flexure hinge 45 is incorporated in the support member 32, the support member can be rigidly connected to the component surface 34. This is advantageous with regard to certain methods of attachment; for example, attachment by means of resistance welding. An example of an electrode 46, suitable for use in the attachment process is shown in outline in FIG. 3. The electrode comprises first and second electrode rods 47, 48, which are spaced apart from each other. The spacing is sufficient to enable the rods to pass the peripheral edges of the first and second upright portions 37, 38 and make contact with the first and second attachment feet 41, 42 respectively. Suitably, the first attachment foot 41 and the second attachment foot 42 extend outwardly from the first and second upright portions respectively by an amount that is at least equal to the diameter of an electrode rod. Then, by passing an appropriate current through the electrode rods 47, 48, the support member 32 of the strain sensor 30 can be welded to the bearing surface at first and second attachment places in a single operation. Furthermore, a welding angle of 90 degrees can be used, which enhances the speed and automatability of the attachment process. To improve the weld quality, a strip of filler material 40 is again provided between the bearing surface 34 and the support member 32. The filler material 40 can be provided on the underside of the attachment feet 41, 42 or can be provided on the component surface 34 prior to the welding process.

The second aspect of the invention, where the support member incorporates a flexure hinge, allows the strain sensor to be attached to a component surface in other ways besides welding. For example, by means of a form fit.

Figure 4A:
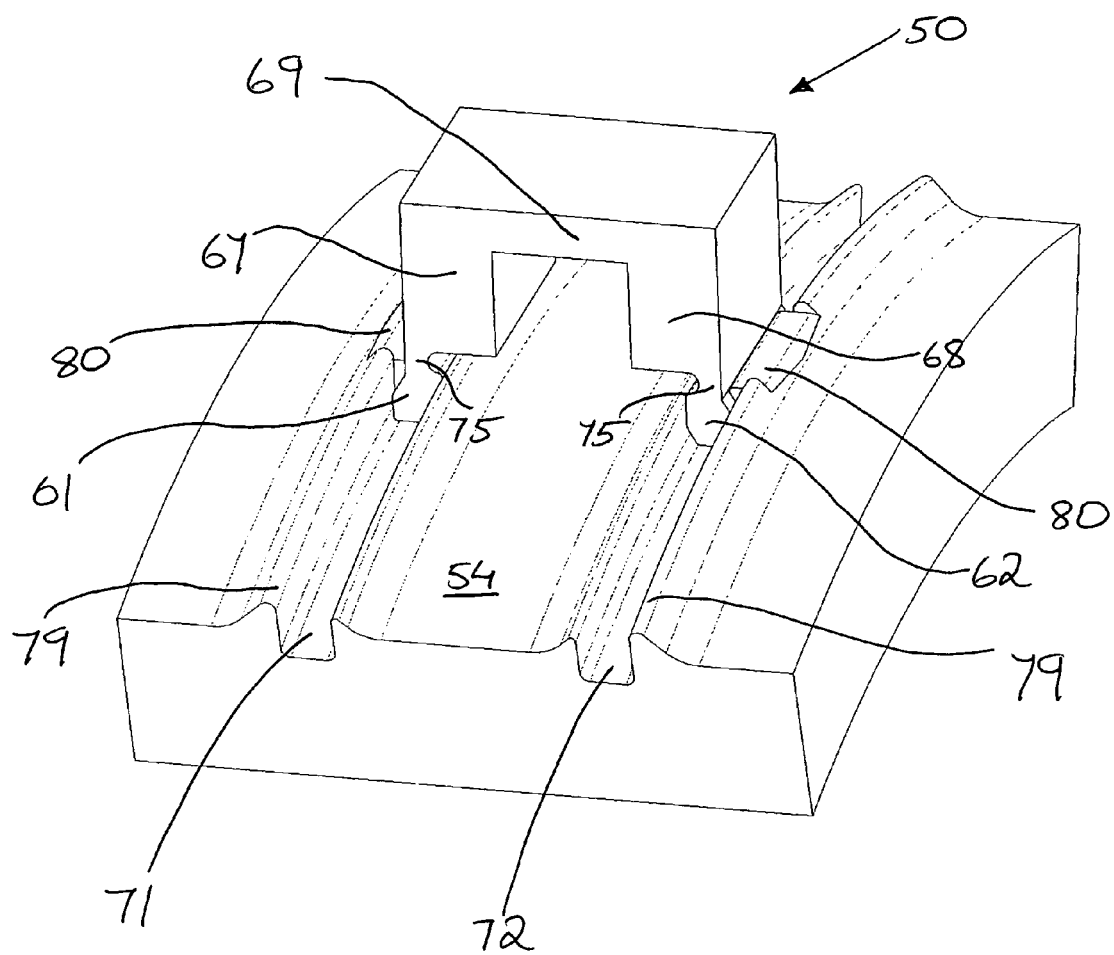
FIG. 4a is a perspective view of a strain sensor according to the second aspect attached to a surface of a bearing outer ring.

A partial perspective view of a strain sensor attached to a component surface by one example of a form fit is shown in FIG. 4a. In this example, the component surface 54 is an outer circumference of a bearing outer ring, which is provided with a first and a second circumferential groove 71, 72. The grooves may be provided in a cold turning operation or other suitable machining process. The strain sensor 50 comprises first and second upright portions 67, 68 having corresponding first and second attachment feet 61, 62, which are adapted to fit in the first and second circumferential grooves 71, 72 respectively. To ensure that a relative displacement of the attachment feet 61, 62 causes a strong and stable bending response of the bending beam portion 69, the support member comprises a flexure hinge 75 between the first upright 67 and the first attachment foot 61 and between the second upright 68 and the second attachment foot 62.

Figure 4B:
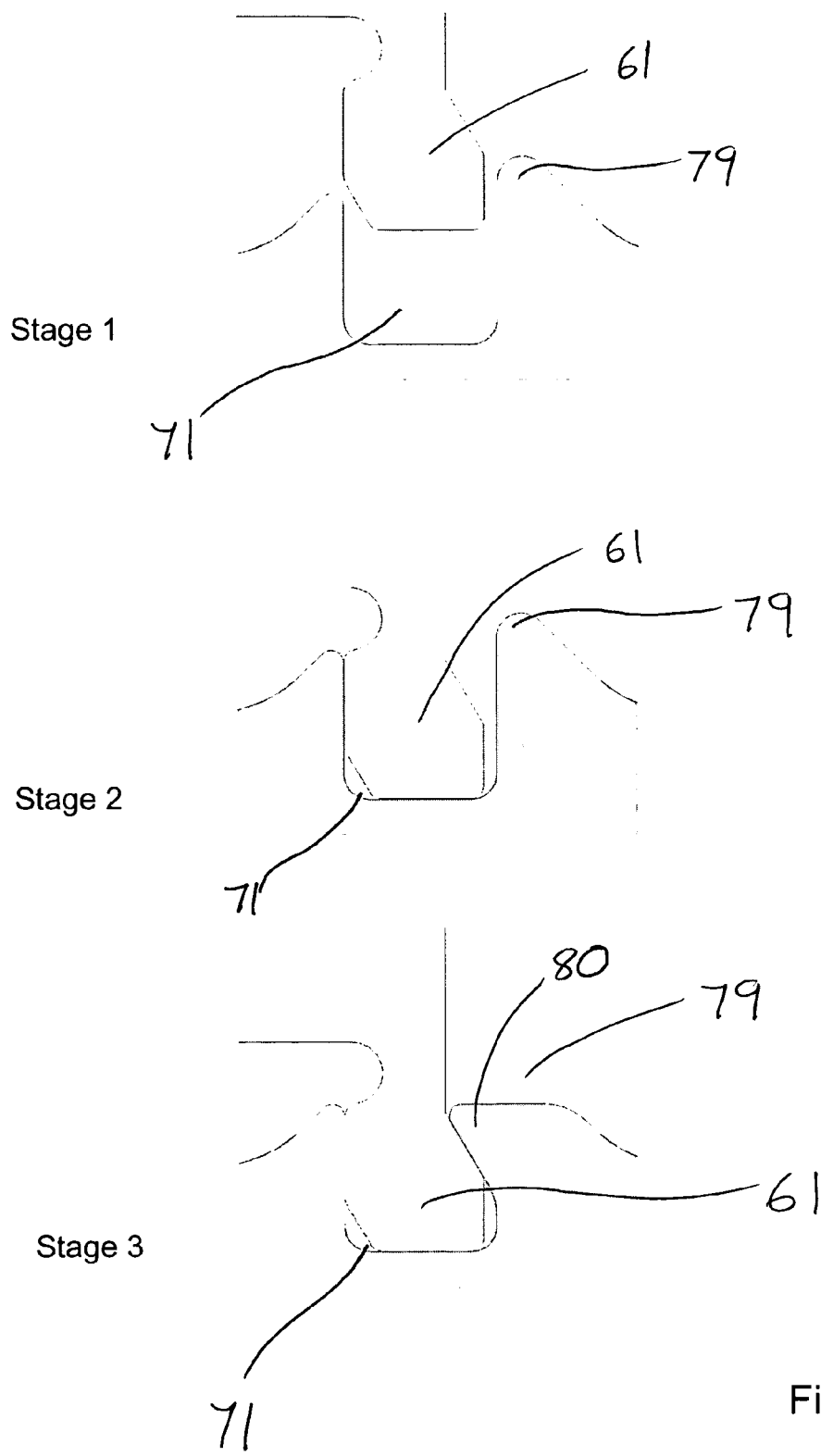
FIG. 4b illustrates in three stages how part of a strain sensor as shown in FIG. 4a is attached to the bearing.

The strain sensor 50 is securely and rigidly attached to the bearing surface 54, by a method that is more clearly illustrated in FIG. 4b, which shows the first attachment foot 61 and the first circumferential groove 71 in three stages of the method. In stage 1, the attachment foot is being inserted into the groove. In stage 2, the attachment foot is resting in the groove. In stage 3, the attachment foot has been securely clamped within the groove.

An outer peripheral edge of each circumferential groove 71, 72 comprises a lip 79 which protrudes above a lower-lying section of each attachment foot 61, 62. To lock the first and second attachment feet within the first and second circumferential grooves respectively, an adjacent part 80 of each lip 79 is deformed against the lower-lying section of each attachment foot 61, 62. The deformation can be carried out in a cold forging process or other material deformation process. In some examples, only one of the first attachment and second attachment foot is clamped by means of e.g. cold forging a part 80 of the groove lip 79.

Other types of form fit can also be applied. For example, the attachment foot of each upright portion may have a predetermined shape that is adapted to fit in a corresponding recess in the bearing ring having the same predetermined shape, such that a friction form fit ensues. Alternatively, the corresponding recess can have a dimension that is smaller than the corresponding dimension of the attachment foot, so as to produce an interference fit.

In FIG. 4a, the strain sensor 50 is attached with an axial orientation, i.e. the longitudinal direction of the strain sensor is translationally parallel to an axial centreline of the bearing. It is also possible to attach one or more strain sensors with a circumferential orientation in a manner similar to that described with reference to FIGS. 4a and 4b. The bearing outer ring may then comprise one circumferential groove with a width equal to the width of the strain sensor, whereby each edge of the groove has a lip. Suitably, the strain sensor has first and second attachment feet that extend from the first and second upright portions in opposite circumferential directions. The strain sensor is then secured to the bearing surface by deforming opposing parts of each lip groove over the circumferentially extending attachment feet.

For the sake of clarity of detail, the figures thus far have shown only part of a component surface and only one attached strain sensor. As will be understood, a component such as a rolling element bearing may be advantageously provided with more than one strain sensor according to the invention, which are attached only at first and second attachment places. An advantage of only two attachment places is that the strain sensor has maximum sensitivity in one measurement direction, and a significantly lower sensitivity to strains in other directions. This is particularly advantageous when measuring bearing ring deformation due to radial and moment forces. For example, if the sensor is attached with a circumferential orientation to measure the circumferential strains induced in the bearing ring, the measured signal is much less influenced by axial and shear strains in comparison with strain sensors that are attached to a bearing over their full surface area. Likewise, when attached with an axial orientation, the sensor is predominantly sensitive to axial strains and is only marginally influenced by shear and circumferential strains.

An advantage of providing a bearing with a plurality of strain sensors is that a particular load of interest (in one degree of freedom) can be determined more accurately. A bearing can therefore be provided with a plurality of strain sensors according to the invention, which are oriented in the same direction to measure a load of interest, e.g. radial load, acting on the bearing. Alternatively, if the bearing is subject in use to more than one load of interest, e.g. axial load and radial load, the bearing can comprise at least one strain sensor that is oriented to be sensitive to axial load and at least one strain sensor that is sensitive to radial load. When the bearing is provided with more than one strain sensor, it is advantageous if the strain sensors can be attached to the bearing as a sensor module. An example of a sensor module attached to a bearing outer ring is shown in a perspective view in FIG. 5.

In this example, more than one strain sensor is provided on the bearing ring 92 by means of an intermediate carrier 95. The strain sensors 90 are strain sensors as described with regard to the second aspect of the invention and comprise upright portions, which are attached to the intermediate carrier 95 at first and second attachment places, whereby the support member of the strain sensor comprises at least one flexure hinge. As illustrated, the strain sensors 90 on the intermediate carrier can have different orientations. The intermediate carrier 95 can be a flat strip of sheet metal in the form of a part ring that has the same radius of curvature as the radially outer surface of the bearing ring 92. The part ring can also be slightly more curved than the radially outer surface, so that a clamping effect is achieved. The intermediate carrier 95 is rigidly connected to the bearing surface, by means of e.g. welding, and the strain sensors 90 are rigidly connected to the intermediate carrier, via welding or a form fit as previously described. Thus, when a load acting on the bearing causes the bearing surface to e.g. stretch, the attachment places of the strain sensors will still experience relative displacement and, due to the flexure hinges, the relative displacement will cause a strong and stable bending response on the measuring surface of the strain sensor.

A number of aspects/embodiments of the invention have been described. It is to be understood that each aspect/embodiment may be combined with any other aspect/embodiment unless indicated to the contrary. Moreover, the invention is not restricted to the described embodiments, but may be varied within the scope of the accompanying patent claims.

REFERENCE NUMERALS

Figure 5:
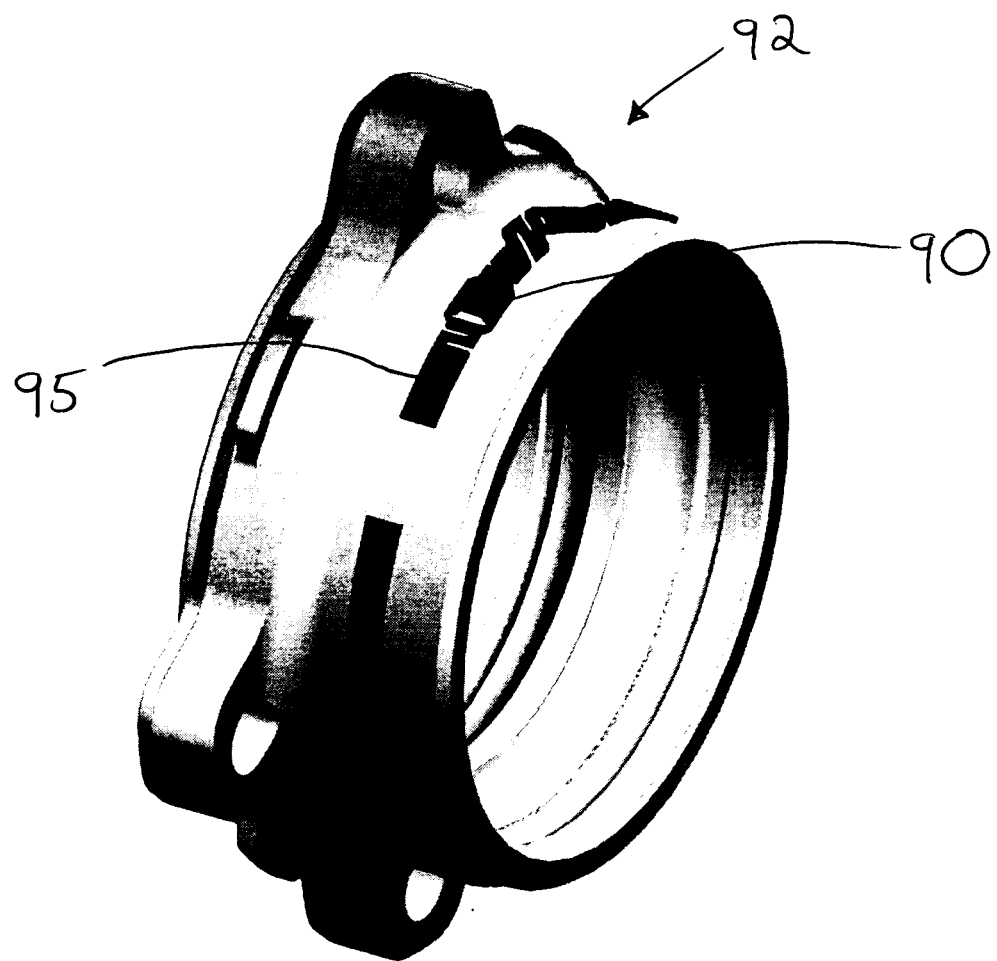
FIG. 5 is a perspective view of a bearing outer ring provided with a sensor module that comprises one or more strain sensors according to the second aspect of the invention.

FIG. 1 and FIG. 2
10 strain sensor
11 strain gauge
12 support member of strain sensor
13 measuring surface of support member
14 surface of bearing
15 first welded connection
16 second welded connection
17 first upright portion of support member
18 second upright portion of support member 19 bending beam portion of support member
20 filler material
21 first attachment foot of support member
22 second attachment foot of support member
25 flexure hinge
28 laser beam
L length of support member (and bending beam)
W width of support member (and each upright portion)
H height of support member (and each upright portion)
$t_B$ thickness of beam portion
$t_U$ thickness of an upright
FIG. 3
30 strain sensor
31 strain gauge
32 support member of strain sensor
33 measuring surface of support member
34 surface of bearing
37 first upright portion of support member
38 second upright portion of support member
39 bending beam portion of support member
40 filler material
41 first attachment foot of support member
42 second attachment foot of support member
45 flexure hinge
46 resistance welding electrode
47 first electrode rod
48 second electrode rod
FIG. 4a and FIG. 4b
50 strain sensor
54 bearing surface
61 first attachment foot of strain sensor
62 second attachment foot of strain sensor
67 first upright portion of support member
68 second upright portion of support member
69 bending beam portion of support member
71 first circumferential groove
72 second circumferential groove
75 flexure hinge
79 groove lip
80 deformed part of groove lip
FIG. 5
90 strain sensor
92 bearing outer ring
95 intermediate carrier

The invention claimed is:

1. A strain sensor for measuring strains induced on a component surface, the strain sensor comprising:
a support member comprising first and second upright portions and a beam portion therebetween, wherein the first and second upright portions are attached to the component surface at first and second attachment places using first and second attachment means, and wherein the beam portion is adapted to bend in response to a relative displacement of the first and second attachment places;
a strain gauge coupled to a surface of the beam portion; and
at least one flexure hinge disposed at least partially between the first upright portion, the second upright portion, or both and the component surface.

2. The strain sensor according to claim 1, wherein the support member has one of a U-shaped and an H-shaped profile, and wherein the first upright portion and the second upright portion rigidly adjoin the beam portion at corresponding first and second lateral ends on the beam portion.

3. The strain sensor according to claim 1, wherein one of the first and second attachment means comprises the at least one flexure hinge.

4. The strain sensor according to claim 1, wherein the at least one flexure hinge comprises a plurality of flexure hinges and each of the first and second attachment means comprises at least one of the plurality of flexure hinges.

5. The strain sensor according to claim 1, wherein the first and second attachment means are respectively formed by a first welded connection and a second welded connection.

6. The strain sensor according to claim 5, wherein the welded connections are created using a welding angle of between 20 and 25 degrees relative to the component surface at the place of attachment.

7. The strain sensor according to claim 5, wherein the support member has a first attachment foot and a second attachment foot which are fused during the welding process to become part of the first and second welded connections respectively.

8. The strain sensor according to claim 2, wherein the support member comprises the at least at least one flexure hinge.

9. The strain sensor according to claim 8, wherein the support member further comprises rigid first and second attachment feet and wherein the at least one flexure hinge comprises a plurality of flexure hinges, at least one of the plurality of flexure hinges being provided between the first attachment foot and the first upright and at least another one of the plurality of flexure hinges being provided between the second attachment foot and the second upright.

10. The strain sensor according to claim 9, wherein the first and second attachment feet extend perpendicularly from the first and second upright portions respectively, whereby the first and second attachment feet are welded to the component surface using a welding angle of 90 degrees.

11. The strain sensor according to claim 9, wherein at least one of the first and second attachment feet has a predefined shape that fits into a corresponding recess in the component surface.

12. The strain sensor according to claim 11, wherein the form fit is an interference form fit.

13. The strain sensor according to claim 11, wherein the component surface is provided with at least one groove having a groove lip, whereby a part of the groove lip is deformed over an adjacent portion of the support member to clamp the support member in place.

14. The strain sensor according to claim 1, wherein the component surface is a surface of a rolling element bearing.

15. The strain sensor according to claim 1, wherein the component surface is a surface of a carrier element, which carrier element is mountable to a rolling element bearing or other machine part.

16. A strain sensor comprising:
a support member with one of a U-shaped and H-shaped profile, the support member comprising first and second uprights stiffly connected by a bending beam portion; and
a strain gauge coupled to a surface of the bending beam portion, wherein at least one of the first and second uprights comprises a rigid first part and a rigid second part which are connected by a flexure hinge, and wherein the at least one of the first or second uprights is substantially perpendicular to a component surface to which the support member is coupled with the second rigid part being positioned farther away from the component surface than the first rigid part.

17. A method of attaching a strain sensor to a surface of a bearing, where the strain sensor comprises a strain gauge coupled to a surface of a support member, the method comprising:

welding the support member to the bearing surface at a first welded connection and a second welded connection, wherein the welding is performed using a welding angle of between 20 and 25 degrees relative to the bearing surface at the locations of the first and second welded connections, wherein the support member comprises first and second upright portions and a beam portion therebetween, and wherein at least one flexure hinge is disposed at least partially between the first upright portion, the second upright portion, or both and the bearing surface.

18. The method according to claim 17, wherein the method further comprises providing an attachment foot between the support member and the bearing surface, at the location of the first and second welded connections, the attachment foot being slender in relation to adjacent portions of the support member and the bearing surface.

19. The strain sensor according to claim 1, wherein the first and second upright portions comprise a first attachment foot and a second attachment foot, respectively, and wherein at least one of the first or second attachment feet has a predefined shape that fits into a corresponding recess in the component surface.

* * * * *